United States Patent
Steele et al.

(10) Patent No.: US 9,499,027 B2
(45) Date of Patent: Nov. 22, 2016

(54) OPERATION OF TRANSPORT REFRIGERATION SYSTEMS TO PREVENT ENGINE STALL AND OVERLOAD

(75) Inventors: John T. Steele, Marcellus, NY (US);
John R. Reason, Liverpool, NY (US);
(Continued)

(73) Assignee: CARRIER CORPORATION, Farmington, CT (US)

(*) Notice: Subject to any disclaimer, the term of this patent is extended or adjusted under 35 U.S.C. 154(b) by 522 days.

(21) Appl. No.: 13/876,270

(22) PCT Filed: Sep. 20, 2011

(86) PCT No.: PCT/US2011/052265
§ 371 (c)(1),
(2), (4) Date: Sep. 26, 2013

(87) PCT Pub. No.: WO2012/047499
PCT Pub. Date: Apr. 12, 2012

(65) Prior Publication Data
US 2014/0144164 A1    May 29, 2014

(51) Int. Cl.
*F25B 45/00*    (2006.01)
*F25D 17/06*    (2006.01)
(Continued)

(52) U.S. Cl.
CPC ........ *B60H 1/3208* (2013.01); *B60H 1/00364* (2013.01); *B60H 1/3222* (2013.01); *B60H 1/3232* (2013.01); *B60H 2001/3273* (2013.01)

(58) Field of Classification Search
CPC .............. B60H 1/3222; B60H 1/00364; B60H 1/3208; B60H 1/3232; B60H 2001/3273
(Continued)

(56) References Cited

U.S. PATENT DOCUMENTS 3,665,725 A    5/1972 Barlass et al.
3,950,700 A *  4/1976 Weisbart .................. G01P 1/10
                                                    324/161

(Continued)

FOREIGN PATENT DOCUMENTS

CN    201155889 Y    11/2008
CN    101553699 A    10/2009
(Continued)

OTHER PUBLICATIONS

International Search Report and Written Opinion of the International Searching Authority for International Application No. PCT/US2011/052265, Jun. 1, 2012, 20 pages.
(Continued)

*Primary Examiner* — Henry Crenshaw
(74) *Attorney, Agent, or Firm* — Cantor Colburn LLP

(57) ABSTRACT

The performance of a transport refrigeration system (12) having a transport refrigeration unit powered by a diesel engine is optimized by matching a capacity output of the transport refrigeration unit to an available shaft power of the diesel engine. The power consumption of the transport refrigeration may be controlled by selectively limiting refrigerant mass flow through the refrigerant circuit of the transport refrigeration unit in response to an operating engine load and an operating speed of the diesel engine.

5 Claims, 4 Drawing Sheets

(75) Inventors: Michael Stockbridge, Canastota, NY (US)

(51) Int. Cl.
  *F25B 43/00* (2006.01)
  *B60H 1/32* (2006.01)
  *B60H 1/00* (2006.01)

(58) Field of Classification Search
  USPC .......................................................... 62/115
  See application file for complete search history.

(56) References Cited

U.S. PATENT DOCUMENTS

| | | | |
|---|---|---|---|
| 4,060,400 A | 11/1977 | Williams | |
| 4,234,926 A | 11/1980 | Wallace et al. | |
| 4,327,558 A | 5/1982 | Howland | |
| 4,353,221 A | 10/1982 | Taylor | |
| 4,419,866 A | 12/1983 | Howland | |
| 4,663,725 A | 5/1987 | Truckenbrod et al. | |
| 4,667,480 A | 5/1987 | Bessler | |
| 4,685,306 A | 8/1987 | Howland et al. | |
| 4,748,818 A | 6/1988 | Satterness et al. | |
| 4,789,025 A | 12/1988 | Brandemuehl et al. | |
| 4,790,143 A | 12/1988 | Hanson | |
| 4,878,465 A | 11/1989 | Hanson et al. | |
| 4,899,549 A | 2/1990 | Berge et al. | |
| 4,899,550 A | 2/1990 | Chopko et al. | |
| 4,932,219 A | 6/1990 | Howland et al. | |
| 4,949,550 A | 8/1990 | Hanson | |
| 4,977,751 A | 12/1990 | Hanson | |
| 4,977,752 A | 12/1990 | Hanson | |
| 5,010,740 A | 4/1991 | Backus et al. | |
| 5,103,783 A | 4/1992 | Hanson | |
| 5,107,686 A | 4/1992 | Howland | |
| 5,123,253 A | 6/1992 | Hanson | |
| 5,123,263 A | 6/1992 | Gustafson | |
| 5,140,825 A | 8/1992 | Hanson | |
| 5,140,826 A | 8/1992 | Hanson | |
| 5,161,383 A | 11/1992 | Hanson | |
| 5,161,384 A | 11/1992 | Hanson | |
| 5,168,713 A | 12/1992 | Howland | |
| 5,172,560 A | 12/1992 | Jurewicz et al. | |
| 5,193,353 A | 3/1993 | Brendel et al. | |
| 5,201,185 A | 4/1993 | Hanson et al. | |
| 5,201,186 A | 4/1993 | Hanson | |
| 5,222,368 A | 6/1993 | Hanson | |
| 5,249,429 A | 10/1993 | Hanson | |
| 5,275,011 A | 1/1994 | Hanson | |
| 5,303,560 A | 4/1994 | Hanson | |
| 5,454,229 A | 10/1995 | Hanson | |
| 5,456,088 A | 10/1995 | Hanson | |
| 5,531,070 A * | 7/1996 | Berger | F02D 17/04 123/198 DB |
| 5,557,938 A | 9/1996 | Hanson | |
| 5,557,941 A | 9/1996 | Hanson | |
| 5,572,879 A | 11/1996 | Harrington | |
| 5,579,648 A | 12/1996 | Hanson | |
| 5,626,027 A | 5/1997 | Dormer et al. | |
| 5,893,272 A * | 4/1999 | Hanselmann | B60H 1/3208 62/133 |
| 5,907,957 A | 6/1999 | Lee et al. | |
| 6,044,651 A | 4/2000 | Reason et al. | |
| 6,059,016 A | 5/2000 | Rafalovich et al. | |
| 6,112,535 A | 9/2000 | Hollenbeck | |
| 6,148,627 A | 11/2000 | Reason et al. | |
| 6,148,628 A | 11/2000 | Reason et al. | |
| 6,170,277 B1 | 1/2001 | Porter et al. | |
| 6,196,012 B1 | 3/2001 | Reason et al. | |
| 6,223,546 B1 * | 5/2001 | Chopko | B60H 1/3232 62/243 |
| 6,318,100 B1 | 11/2001 | Brendel et al. | |
| 6,321,549 B1 | 11/2001 | Reason et al. | |
| 6,367,269 B1 | 4/2002 | Hanson et al. | |
| 6,405,550 B1 | 6/2002 | Reason et al. | |
| 6,487,869 B1 | 12/2002 | Sulc et al. | |
| 6,543,242 B2 | 4/2003 | Reason et al. | |
| 6,543,428 B1 * | 4/2003 | Blandino | F02M 33/00 123/585 |
| 6,679,071 B1 * | 1/2004 | Storey | B60H 1/00642 236/51 |
| 6,708,507 B1 | 3/2004 | Sem et al. | |
| 7,043,927 B2 | 5/2006 | Burchill et al. | |
| 7,937,962 B2 | 5/2011 | Dudley et al. | |
| 7,966,838 B2 | 6/2011 | Lifson et al. | |
| 7,997,092 B2 | 8/2011 | Lifson et al. | |
| 8,935,933 B1 * | 1/2015 | Koelsch | B60H 1/00428 62/115 |
| 2002/0053212 A1 * | 5/2002 | Iwanami | B60H 1/3208 62/133 |
| 2002/0100285 A1 * | 8/2002 | Baruschke | B60H 1/3208 62/133 |
| 2002/0108388 A1 * | 8/2002 | Wilson | B60H 1/3208 62/323.3 |
| 2002/0162344 A1 | 11/2002 | Reason et al. | |
| 2003/0226368 A1 | 12/2003 | Nosaka | |
| 2004/0003614 A1 * | 1/2004 | Parsch | B60H 1/3208 62/228.1 |
| 2004/0163860 A1 * | 8/2004 | Matsuzaki | B60K 6/44 180/65.225 |
| 2006/0042282 A1 | 3/2006 | Ludwig et al. | |
| 2008/0271472 A1 * | 11/2008 | Leroy | B60H 1/00428 62/236 |
| 2009/0013701 A1 | 1/2009 | Lifson et al. | |
| 2009/0299534 A1 | 12/2009 | Ludwig | |
| 2010/0045105 A1 | 2/2010 | Bovio et al. | |
| 2010/0107661 A1 | 5/2010 | Awwad et al. | |
| 2010/0154449 A1 | 6/2010 | Stover, Jr. et al. | |
| 2010/0171364 A1 | 7/2010 | Awwad | |
| 2010/0236264 A1 | 9/2010 | Lifson | |

FOREIGN PATENT DOCUMENTS

| | | |
|---|---|---|
| DE | 19642832 C1 | 9/1997 |
| DE | 29816787 U1 | 1/2000 |
| DE | 10106243 A1 | 8/2002 |
| EP | 0435487 A2 | 7/1991 |
| EP | 0522847 A2 | 1/1993 |
| EP | 0602936 A2 | 6/1994 |
| EP | 1038702 A2 | 9/2000 |
| EP | 1038705 A2 | 9/2000 |
| EP | 1039252 A2 | 9/2000 |
| EP | 1039253 A1 | 9/2000 |
| EP | 1375216 A1 | 1/2004 |
| GB | 1493966 A | 1/2000 |
| WO | 2008100250 A1 | 8/2008 |

OTHER PUBLICATIONS

Chinese First Office Action for application 201180048868.3, dated Dec. 31, 2014, 12 pages.
PCT International Preliminary Report on Patentability and Written Opinion of the International Searching Authority for International Application No. PCT/US2011/052265, Apr. 11, 2013, 8 pages.
Russian Office Action for application RU2013114425/11 dated Oct. 26, 2015, 4 pages.
European Office Action for application 11761782.9, dated Aug. 31, 2015, 7 pages.

* cited by examiner

OPERATION OF TRANSPORT REFRIGERATION SYSTEMS TO PREVENT ENGINE STALL AND OVERLOAD

CROSS-REFERENCE TO RELATED APPLICATION

This application claims priority to U.S. Provisional Patent Application Ser. No. 61/387,177, entitled "Operation of Transport Refrigeration Systems to Prevent Engine Stall and Overload," filed on Sep. 28, 2010. The content of this application is incorporated herein by reference in it entirety.

FIELD OF THE INVENTION

This invention relates generally to the operation of a transport refrigeration system and, more particularly, to maintaining cooling performance of a transport refrigeration system while preventing engine stalls as well as overload of the engine.

BACKGROUND OF THE INVENTION

Fruits, vegetables and other perishable items, including meat, poultry and fish, fresh or frozen, are commonly transported in the cargo box of a truck or trailer, or in an intermodal container. Accordingly, it is customarily to provide a transport refrigeration system in operative association with the cargo box for cooling the atmosphere within the cargo box. The transport refrigeration system includes a refrigerant vapor compression system, also referred to as a transport refrigeration unit, and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes an engine, typically diesel powered.

In many truck/trailer transport refrigeration systems, the compressor of the transport refrigeration unit is driven by the engine shaft either through a belt drive or by mechanical shaft-to-shaft link. More recently, all electric transport refrigeration systems have been developed for truck/trailer applications wherein the engine drives an on-board generator for generating sufficient electrical power to drive an electric motor operatively associated with the compressor of the transport refrigeration unit. For example, U.S. Pat. No. 6,223,546, assigned to Carrier Corporation, the same assignee to which this application is subject to assignment, the entire disclosure of which is incorporated herein by reference in its entirety, discloses an electrically powered transport refrigeration unit powered by an engine driven synchronous generator capable of producing sufficient power to operate the compressor drive motor and at least one fan motor. With respect to intermodal containers, clip-on power units, commonly referred to as generator sets or gensets, are available for mounting to the intermodal container, typically when the container is being transported by road or rail, to provide electrical power for operating the compressor drive motor of the transport refrigeration unit associated with the container. The genset includes a diesel engine and a generator driven by the diesel engine.

During transport of such perishable items the temperature within the cargo box of the truck, trailer or container must be maintained within strict temperature limits associated with the particular items being transported, regardless of potentially severe operating conditions imposed by the local environment in which the system is operating. For example when the transport refrigeration system is operated at high ambient temperatures and/or high altitude operation, the power demanded by the refrigeration unit at high cooling capacity demand may exceed the limited shaft power available from the engine, raising the potential for an engine stall or engine overload. In the event of an engine stall or engine overload, the loss of power from the generator will result in an undesired shutdown of the refrigeration unit.

In conventional transport refrigeration systems, the control system is open loop in that the system controller is unaware of the actual operating engine load. Rather, the transport refrigeration system controller uses algorithms that include safety margins to limit the engine shaft power demand in an attempt to prevent overload of the engine. However, at times, such as under aggravated service conditions and during transient operations, a lost in refrigeration unit performance and engine stalls or overload can still occur. A need exists for controlling the operation of the refrigeration unit in response to actual engine operating conditions so as to avoid engine stall or engine overload.

SUMMARY OF THE INVENTION

In an aspect, a method is provided for optimizing the performance of a transport refrigeration system having a transport refrigeration unit powered by a diesel engine, including the step of matching a capacity output of the transport refrigeration unit to an available shaft power of the diesel engine. The method may also include the step of operating the transport refrigeration system at the capacity output necessary to meet a current refrigeration demand load so as long as both an operating fuel rack position of the diesel engine is not at 100% and an operating speed of the diesel engine does not drop more than five percent.

In an aspect, a method is provided for controlling the power consumption of a transport refrigeration unit having a refrigerant mass flow circulating within a refrigerant circuit having a refrigerant compressor and having a diesel engine for powering the transport refrigeration unit. The method includes the step of selectively limiting refrigerant mass flow through the refrigerant circuit in response to an operating fuel rack position on the diesel engine and on an operating speed of the diesel engine. In an embodiment, the method may include the further steps of: monitoring the operating fuel rack position for the diesel engine; monitoring the operating engine speed of the diesel engine; and selectively adjusting the refrigerant mass flow through the refrigerant circuit of the transport refrigeration unit to maintain the operating fuel rack position at a position less than 98% of the maximum fuel rack position and to simultaneously maintain the operating engine speed at a speed of at least 98% of a maximum engine operating speed. In an embodiment, the method may include the further steps of: monitoring the operating fuel rack position for the diesel engine; monitoring the operating engine speed of the diesel engine; determining whether the monitored fuel rack position is at a position of at least 90% of a maximum fuel rack position; determining whether the monitored engine speed is at a speed of at least 98% of a maximum engine speed; and if both the monitored fuel rack position is at a position of at least 90% of a maximum fuel rack position and the monitored engine speed is at a speed of at least 98% of a maximum engine speed, restricting an increase in refrigerant mass flow through the compressor.

In an aspect, a method is provided for controlling the operation of a transport refrigeration unit having a refrigerant mass flow circulating within a refrigerant circuit having a refrigerant compressor and a compressor suction modulation valve and having a diesel engine for powering the transport refrigeration unit. The method includes the steps of: determining whether a change in a system operating condition has been requested; and if a system operating condition change has been requested, restricting an increase in refrigerant mass flow by reducing a maximum rate open of the suction modulation valve to 0.1 percent per second.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
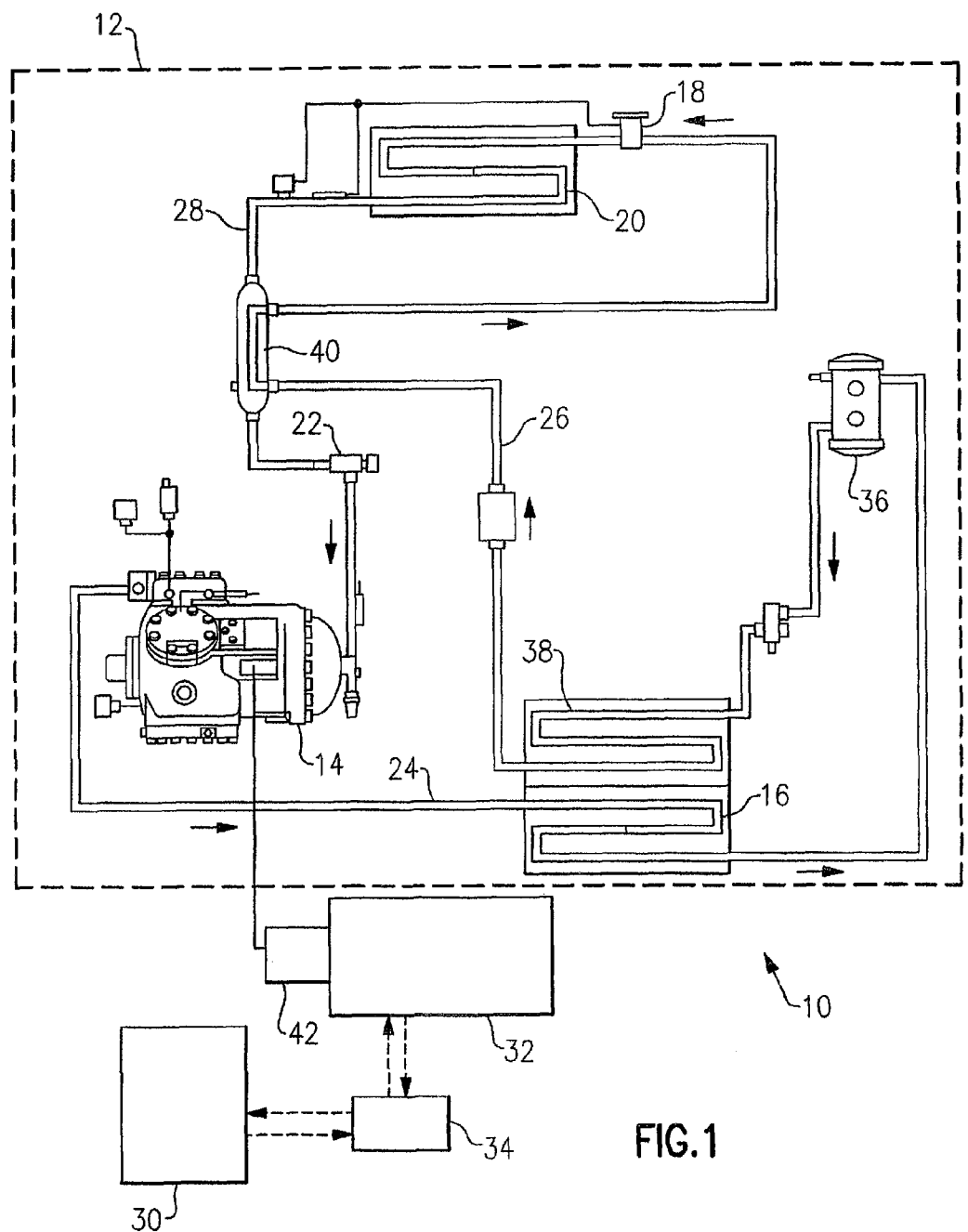
FIG. 1 shows a schematic diagram of an exemplary embodiment of a transport refrigeration system wherein the compressor is by a motor powered by a electric generator driven by a diesel engine.
Figure 2:
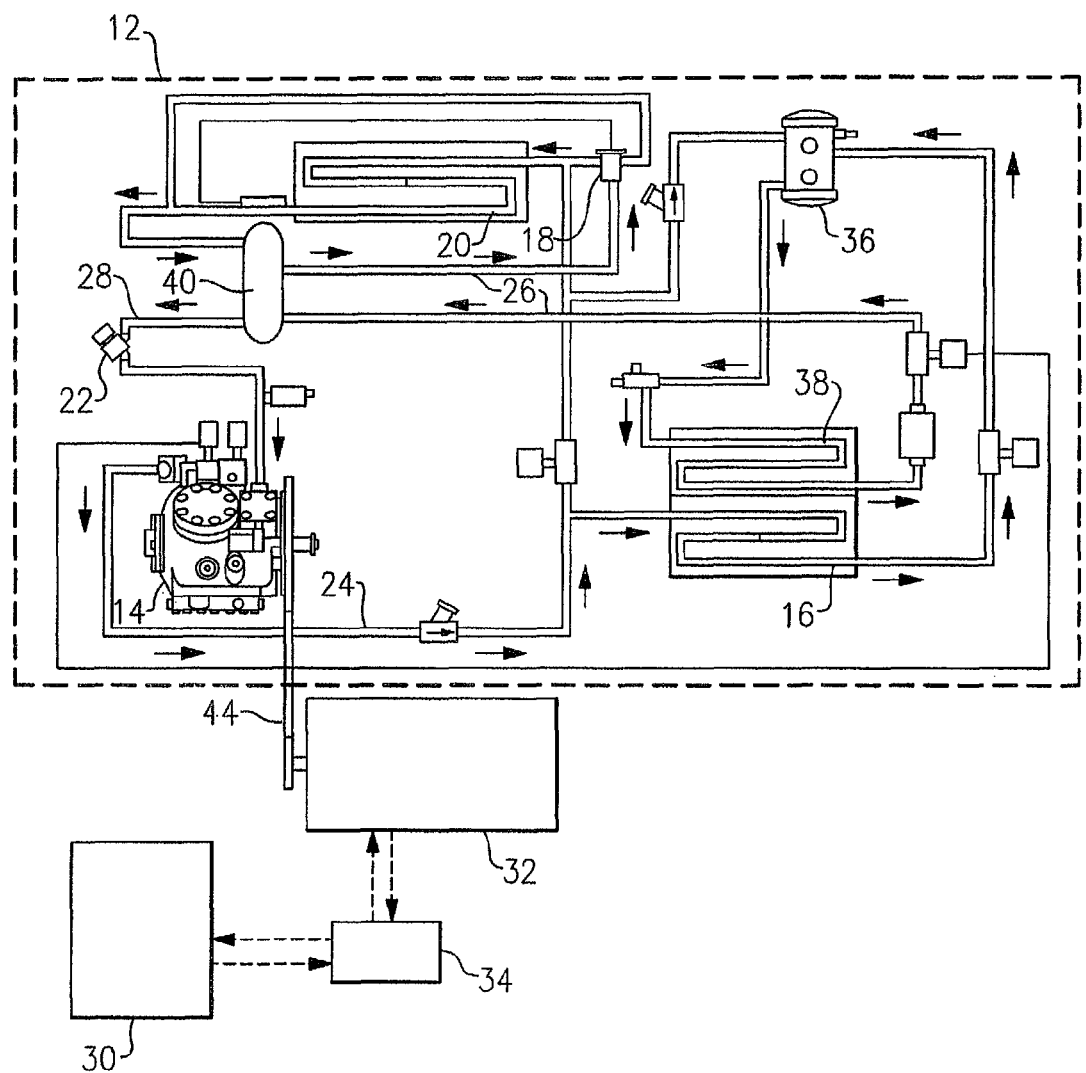
FIG. 2 shows a schematic diagram of an exemplary embodiment of a transport refrigeration system wherein the compressor is driven by a diesel motor through a belt drive.

Referring initially to FIGS. 1 and 2 of the drawing, there are depicted exemplary embodiments of transport refrigeration systems for cooling the atmosphere within the cargo box of a truck, trailer, container, intermodal container or similar cargo transport unit. The transport refrigeration system 10 includes a transport refrigeration unit 12 including a compressor 14, a refrigerant condenser heat exchanger 16, an expansion device 18, a refrigerant evaporator heat exchanger 20 and a suction modulation valve 22 connected in a closed loop refrigerant circuit including refrigerant lines 24, 26 and 28 and arranged in a conventional refrigeration cycle. The transport refrigeration system 10 further includes an electronic system controller 30, a diesel engine 32 and an engine controller 34. The transport refrigeration system 10 is mounted as in conventional practice to an exterior wall of the truck, trailer or container with the compressor 14 and the condenser heat exchanger 16 with its associated condenser fan(s) (not shown) and diesel engine 32 disposed externally of the refrigerated cargo box.

As in conventional practice, when the transport refrigerant unit 12 is operating in a cooling mode, low temperature, low pressure refrigerant vapor is compressed by the compressor 14 to a high pressure, high temperature refrigerant vapor and passed from the discharge outlet of the compressor 14 into refrigerant line 24. The refrigerant circulates through the refrigerant circuit via refrigerant line 24 to and through the heat exchange tube coil or tube bank of the condenser heat exchanger 16, wherein the refrigerant vapor condenses to a liquid, thence through the receiver 36, which provides storage for excess liquid refrigerant, and thence through the subcooler coil 38 of the condenser. The subcooled liquid refrigerant then passes through refrigerant line 24 through a first refrigerant pass of the refrigerant-to-refrigerant heat exchanger 40, and thence traverses the expansion device 18 before passing through the evaporator heat exchanger 20. In traversing the expansion device 18, which may be an electronic expansion valve ("EXV") as depicted in FIG. 1 or a mechanical thermostatic expansion valve ("TXV") as depicted in FIG. 2, the liquid refrigerant is expanded to a lower temperature and lower pressure prior to passing to the evaporator heat exchanger 20.

In flowing through the heat exchange tube coil or tube bank of the evaporator heat exchanger 20, the refrigerant evaporates, and is typically superheated, as it passes in heat exchange relationship return air drawn from the cargo box passing through the airside pass of the evaporator heat exchanger 20. The refrigerant vapor thence passes through refrigerant line 26 to the suction inlet of the compressor 14. In passing through refrigerant line 26, the refrigerant vapor traverses a second refrigerant pass of the refrigerant-to-refrigerant heat exchanger 40 in heat exchange relationship with the liquid refrigerant passing through the first refrigerant pass thereof. Before entering the suction inlet of the compressor 14, the refrigerant vapor passes through the suction modulation valve 22 disposed in refrigerant line 26 downstream with respect to refrigerant flow of the refrigerant-to-refrigerant heat exchanger 40 and upstream with respect to refrigerant flow of the compressor 14. The controller 30 controls operation of the suction modulation valve 22 and selectively modulates the open flow area through the suction modulation valve 22 so as to regulate the flow of refrigerant passing through the suction modulation valve to the suction inlet of the compressor 14. By selectively reducing the open flow area through the suction modulation valve 22, the controller 30 can selectively restrict the flow of refrigerant vapor supplied to the compressor 14, thereby reducing the capacity output of the transport refrigeration unit 12 and in turn reducing the power demand imposed on the engine 32.

Air drawn from within the cargo box by the evaporator fan(s) (not shown) associated with the evaporator heat exchanger 20, is passed over the external heat transfer surface of the heat exchange tube coil or tube bank of the evaporator heat exchanger 20 and circulated back into the interior space of the cargo box. The air drawn from the cargo box is referred to as "return air" and the air circulated back to the cargo box is referred to as "supply air". It is to be understood that the term "air' as used herein includes mixtures of air and other gases, such as for example, but not limited to nitrogen or carbon dioxide, sometimes introduced into a refrigerated cargo box for transport of perishable product such as produce.

Although the particular type of evaporator heat exchanger 20 used is not limiting of the invention, the evaporator heat exchanger 20 may, for example, comprise one or more heat exchange tube coils, as depicted in the drawing, or one or more tube banks formed of a plurality of tubes extending between respective inlet and outlet manifolds. The tubes may be round tubes or flat tubes and may be finned or un-finned.

The compressor 14 may comprise a single-stage or multiple-stage compressor such as, for example, a reciprocating compressor as depicted in the exemplary embodiments shown in FIGS. 1 and 2. However, the compressor 14 may be a scroll compressor or other type of compressor as the particular type of compressor used is not germane to or limiting of the invention. In the exemplary embodiment depicted in FIG. 1, the compressor 14 comprises a reciprocating compressor having a compressing mechanism, an internal electric compressor motor and an interconnecting drive shaft that are all sealed within a common housing of the compressor 14. The diesel engine 32 drives an electric generator 42 that generates electrical power for driving the compressor motor which in turn drives the compression mechanism of the compressor 14. The drive shaft of the diesel engine drives the generator shaft. In an electrically powered embodiment of the transport refrigeration unit 10, the generator 42 comprises a single on-board engine driven synchronous generator configured to selectively produce at least one AC voltage at one or more frequencies. In the embodiment depicted in FIG. 2, the compressor 14 comprises a reciprocating compressor having a compressing mechanism having shaft driven directly by the drive shaft of the diesel engine 32, either through a direct mechanical coupling or through a belt drive 38 as illustrated in FIG. 2.

As noted previously, the transport refrigeration system 10 also includes an electronic controller 30 that is configured to operate the transport refrigeration unit 12 to maintain a predetermined thermal environment within the interior space defined within the cargo box wherein the product is stored during transport. The controller 30 maintains the predetermined thermal environment selectively powering the various components of the refrigerant vapor compression system, including the compressor 14, the condenser fan(s) associated with the condenser heat exchanger 16, the evaporator fan(s) associated with the evaporator heat exchanger 20, and various valves in the refrigerant circuit, including but not limited to the suction modulation valve 22. The controller 30 also controls the operation of the compressor 14 to selectively varying the output capacity of the compressor 14 to match the cooling demand to maintain the desired product storage temperature for the particular products stored within the refrigerated cargo box.

In one embodiment, the electronic controller 30 includes a microprocessor and an associated memory. The memory of the controller 30 may be programmed to contain preselected operator or owner desired values for various operating parameters within the system. The controller 30 may include a microprocessor board that includes the microprocessor, an associated memory, and an input/output board that contains an analog-to-digital converter which receives temperature inputs and pressure inputs from a plurality of sensors located at various points throughout the refrigerant circuit and the refrigerated cargo box, current inputs, voltage inputs, and humidity levels. The input/output board may also include drive circuits or field effect transistors and relays which receive signals or current from the controller 30 and in turn control various external or peripheral devices associated with the transport refrigeration system. The particular type and design of the electronic controller 30 is within the discretion of one of ordinary skill in the art to select and is not limiting of the invention.

The system controller 30 is also in communication with the electronic engine controller 34. For example, the system controller 30 may be in closed loop communication with the electronic engine controller 34 by way of a controller area network (CAN) system. The system controller 30 determines the operating load state of the engine 32 based on input received from the electronic engine controller 34. For example, in an embodiment, the electronic engine controller 34 senses the position of the mechanical fuel rack, which essentially represents a fuel throttle position, and is indicative of the level of fuel flow being supplied to the engine 32 relative to the maximum permissible fuel flow fuel, which is indicative of the operating engine load relative to the maximum operating engine load. The electronic engine controller 34 also senses the operating engine speed, that is engine revolutions per minute (RPM), of the engine 32 in real time. The system controller 30 monitors both the fuel rack position and the operating engine speed through interrogation of the electronic engine controller 34. For example, in an embodiment, the electronic engine controller 34 may detect the fuel rack position and the operating engine speed (RPM) at one second intervals, and the system controller 30 may determine engine load based on a running average of the past thirty seconds of readings for both fuel rack position. Engine operating speed (RPM) may also be based on a running average of RPM measurements taken over a time interval, for example the past thirty seconds.

In accordance with an aspect of the disclosure, the system controller 30 optimizes the performance of the transport refrigeration system 10 by matching the capacity output of the transport refrigeration unit 12 to an available shaft power of the diesel engine, which equates to matching the power demand of the refrigerant unit 12 to an available shaft horsepower of the diesel engine 32. By doing so, enhanced fuel economy and improved system capacity control can be realized. Additionally, engine output can be maximized while avoiding engine overload and engine stalls. Controlling the power consumption of the transport refrigeration system can also permit a smaller engine, that is an engine having a lower maximum available shaft power, to be used. By monitoring both the fuel rack position and the operating engine speed, the system controller determines the real time operating load state of the engine 32 and can adjust the capacity output of the transport refrigeration unit 12 to match the available shaft power of the engine 32 as necessary. For example, the system controller 30 can adjust the capacity output of the transport refrigeration unit 12 by selectively adjusting the suction modulation valve (SMV) 22 to adjust the flow of refrigerant vapor to the suction inlet of the compressor 14. The system controller 30 can also adjust the capacity output of the transport refrigeration unit 12 by other techniques known in the art such as, but not limited to, unloading the compressor 14 to reduce the flow of high pressure refrigerant through the refrigerant circuit, ceasing operation in an economizer mode, throttling the evaporator expansion valve closed or a combination thereof.

In determining the operating state of the engine 32, the system controller 30 analysis the operating fuel rack position, expressed as a percent of the fuel rack position at a 100% fuel flow setting, and the operating engine speed in RPM, expressed as a percent of the target engine RPM, which is an indication of engine RPM droop, that is a drop-off in the real-time operating engine RPM relative to the target engine RPM. Thus, as used herein, an engine RPM droop of 98% would mean that the operating engine RPM is two percent below the target engine RPM. Similarly, an engine RPM droop of greater than 98% would indicate an operating engine RPM that is less than 2% below the target engine RPM and an engine RPM droop of less than 98% would indicate an operating engine RPM that is more than 2% below the engine target RPM. In many applications, the diesel engine 32 may have two operating RPM points, that is a relatively lower RPM for low speed operation and a relatively higher RPM for high speed operation. In such case, the target RPM would be selected by the system controller 30 based upon whether the engine 32 was currently operating in a low speed mode or a high speed mode.

In an aspect of the method of optimizing the performance of the transport refrigeration system as disclosed herein, the system controller 30 operates the transport refrigeration system in a normal operating mode at a capacity output necessary to meet a current refrigeration demand load so as long as the operating fuel rack position is not at 100% with the engine operating speed dropping no more than a few percent, for example dropping no more than two percent (i.e.

an engine RPM droop of no less than 98%). An operating engine RPM of less than 98% of the target engine RPM could indicate an impending engine stall condition. In the normal operating mode, the system controller 30 will permit engine speed shifts, changes in unloader state (on/off), rapid opening or closing of the suction modulation valve 22, and other normal operations. However, when the fuel rack position reaches or exceeds 90% and the operating engine RPM simultaneously drops to 98% of the target engine RPM, the controller 30 unload the compressor 14 and/or close the suction modulation valve 22 to reduce engine load and return the fuel rack position to less than 85% and raise the operating engine RPM to greater than 98% of the target engine RPM. Under these conditions the system controller 30 will allow the rate at which the SMV may be further closed to reach its maximum closing speed. Once the engine load has been reduced, so long as a system change request is not active, the system controller 30 will limit the maximum opening speed of the suction modulation valve (SMV) 32, that is the rate at which the SMV may be further opened, to 0.1% per second and employ as a control limit logic maintaining the fuel rack position at less than 90% and maintaining the engine operating RPM equal to or greater than 98% of the engine target speed.

If under these conditions wherein the fuel rack position reaches or exceeds 90% and the operating engine RPM simultaneously drops to 98% of the target engine RPM, system change is called for, for example a speed shift or a change in unloader state, the system controller 30 will unload the compressor 14 and/or close the suction modulation valve (SMV) 22 to further reduce the engine load to bring the fuel rack position to less than 70% and raise the operating engine RPM to greater than 98% of the target engine RPM. The system controller 30 will also engage control limit logic and bring the engine operating state to a fuel rack position of less than 90% and maintain the operating engine RPM at least 98% of the target RPM, thereby ensuring against an engine stall or engine overload condition occurring. Once the engine load has been reduced, the system controller 30 will allow the system change request but will limit the maximum opening speed of the suction modulation valve (SMV) 32, that is the rate at which the SMV may be further opened, to 0.1% per second and employ as a control limit logic maintaining the fuel rack position at less than 90% and maintaining the engine operating RPM equal to or greater than 98% of the engine target speed.

Figure 3A:
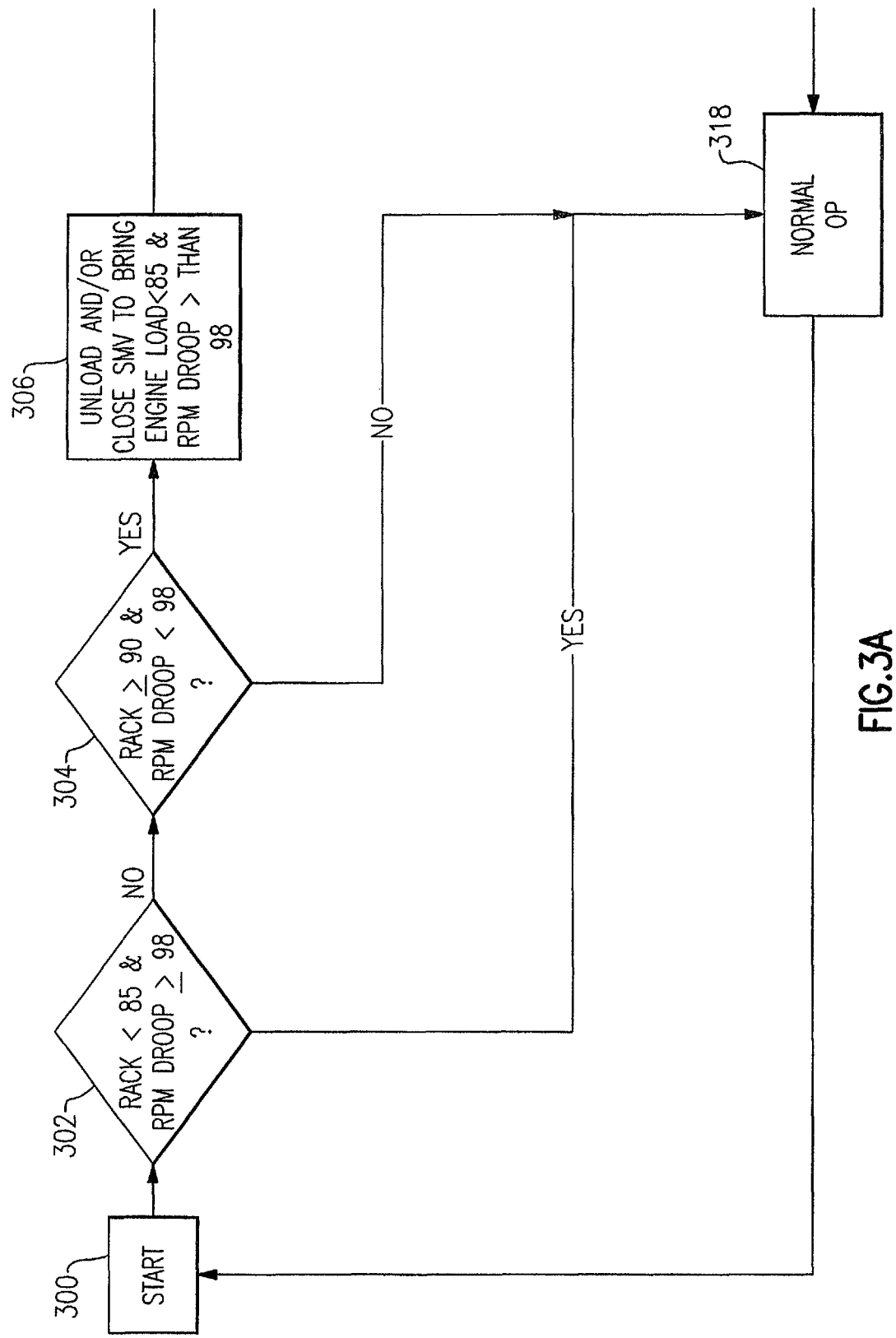
FIGS. 3(a) & (b) show a block diagram illustration of an exemplary embodiment of a control method as disclosed herein.
Figure 3B:
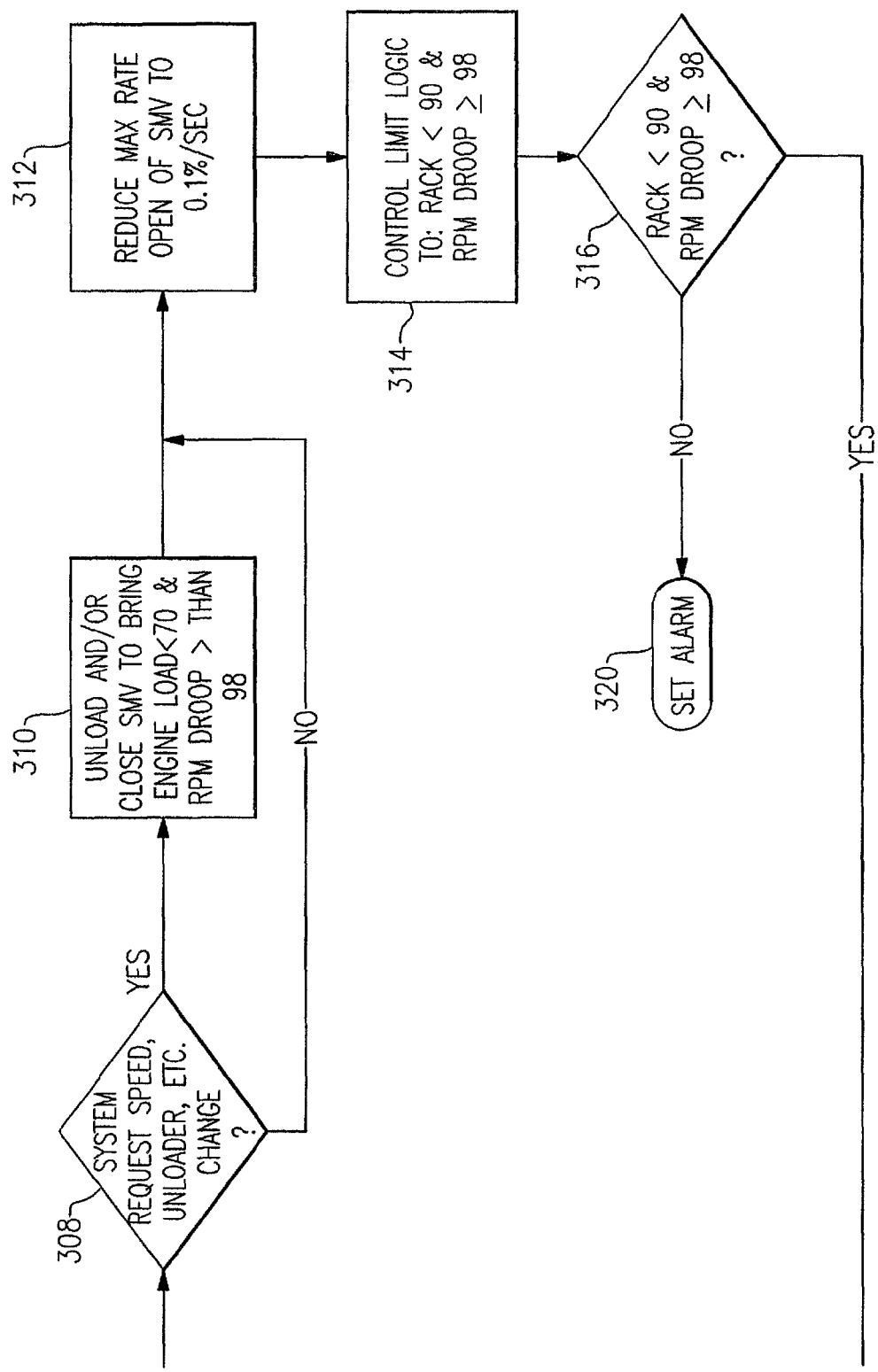

Referring now to FIG. 3, there is depicted in a process schematic block diagram illustrating an exemplary embodiment of a method of the disclosure. At block 300, the controller 30 initiates the process by determining at step 302 both the operating fuel rack position (Rack) as a percent of the maximum fuel rack position at 100% fuel flow to the engine 32 and the operating engine speed as a percent of the maximum engine speed (RPM droop). Both determinations are made based on real time engine operating data obtained from the electronic engine controller 34. As explained earlier, both determinations may be running averages over a selected time interval, such as, for example, the average over a 30 second running period of individual readings made at one second intervals during that period. At block 302, a determination is made as to whether the operating fuel rack position (Rack) is less than 85% and whether the operating engine speed (RPM) is at least 98% of the target engine operating speed (RPM droop). If yes to both conditions, i.e. the operating fuel rack position (Rack) is less than 85% and the operating engine speed is equal to or greater than 98% of the target engine operating speed (RPM droop), the controller 30 maintains normal operation (block 318) of the transport refrigeration system 12.

However, if either one or both of the conditions at block 302 is no, then the system controller 30, at block 304, determines whether the operating fuel rack position (Rack) is at or greater than 90% and whether the operating engine speed is less than 98% of the target engine operating speed (RPM droop). If no to both conditions, i.e. the operating fuel rack position (Rack) is less than 90% and the operating engine speed is at least 98% of the target engine operating speed (RPM droop), the controller 30 maintains normal operation (block 318) of the transport refrigeration system 12.

If, at block 304, the controller 30 determines that the operating fuel rack position (RACK) is at or greater than 90% and the operating engine speed is less than 98% of the target engine operating speed (RPM droop), the system controller 30, at block 306, will reduce the cooling output capacity of the refrigeration unit 12, for example by initiating an unload of the compressor 14 or closing the suction modulation valve (SMV) 22, to bring the operating fuel rack position (Rack) to less than 85% and the operating engine speed to at least 98% of the target engine operating speed (RPM droop). Next, at block 308, the system controller 30 checks to determine whether a system change request is active. A system change request could be, for example, for purposes of illustration but not limitation, a change in engine speed, a compressor unload, or transient condition. If a change request is not active at block 308, the system controller 30 proceeds directly to block 312, and restricts the maximum rate of opening of the suction modulation valve (SMV) 22. to 0.1 percent per second, thereby limiting the rate of increase in refrigerant vapor flow to the suction inlet of the compressor 14, which in turn limits a change in capacity output of the transport refrigeration unit 12. At block 314, the system controller 30 now implements as its control limit logic maintaining the operating fuel rack position (Rack) to less than 90% and the operating engine speed at at least 98% of the target engine operating speed (RPM droop). The system controller 30 will continue to monitor, block 316, the operating fuel rack position (RACK) and the operating engine speed, and permit normal operation (block 318) of the refrigeration system, including the refrigeration unit 12, so long as both the operating fuel rack position (Rack) remains less than 90% and the operating engine speed is at least 98% of the target engine operating speed (RPM droop).

However, if a system change request is active at block 308, the system controller 30, at block 310, will reduce the cooling output capacity of the refrigeration unit 12, for example by initiating an unload of the compressor 14 or closing the suction modulation valve (SMV) 22, to bring the operating fuel rack position (Rack) to less than 70% and the operating engine speed to at least 98% of the target engine operating speed (RPM droop). The system controller 30 then proceeds to block 312 and restricts the maximum rate of opening of the suction modulation valve (SMV) 22. to 0.1 percent per second, thereby limiting the rate of increase in refrigerant vapor flow to the suction inlet of the compressor 14, which in turn limits a change in capacity output of the transport refrigeration unit 12. At block 314, the system controller 30 now implements as its control limit logic maintaining the operating fuel rack position (Rack) to less than 90% and the operating engine speed at at least 98% of the target engine operating speed (RPM droop). During the period of operation of the refrigerant unit at reduced cooling capacity and with restriction on the rate of opening of the suction modulation valve (SMV) 22, the system controller 30 will allow the requested system change occur with little or no risk of an engine overload or engine stall occurring that would lead to insufficient shaft horsepower output from the engine 30. Thus, the risk of a shutdown of the refrigerant system 14 occurring as a result of the system change being implemented is greatly reduced, if not eliminated.

Additionally, at block 316, the system controller 30 continues to monitor whether the operating fuel rack position (Rack) is less than 90% and whether the operating engine speed (RPM) is at least 98% of the target engine operating speed (RPM droop). If, at block 316, the system controller 30 determines that the operating engine speed drops below 98% of the target operating engine speed (RPM droop) or the operating fuel rack position rises above 90%, a system alarm is activated, at block 320, to warn of a potential impending engine stall or engine overload.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. For example, in other embodiments, a different indicator of operating engine load, other than fuel rack position, could be used to monitor the operating engine load, in combination with operating engine speed in carrying out the concept of the method disclosed herein.

Therefore, it is intended that the present disclosure not be limited to the particular embodiment(s) disclosed as, but that the disclosure will include all embodiments falling within the scope of the appended claims.

We claim:

1. A method for optimizing the performance of a transport refrigeration system having a transport refrigeration unit powered by a diesel engine, comprising matching a capacity output of the transport refrigeration unit to an available shaft power of the diesel engine; the method further comprising:
    monitoring an operating engine load of the diesel engine;
    monitoring an operating engine speed of the diesel engine:
    operating the transport refrigeration system at the capacity output necessary to meet a current refrigeration demand load so as long as both the operating engine load of the diesel engine is not at 100% and the operating speed of the diesel engine is at least 98% of a target engine operating speed; and
    reducing the cooling capacity output of the refrigeration unit when the operating engine load of the diesel engine is greater than 90% and an operating speed of the diesel engine is less than 98% of a target engine operating speed.

2. The method of claim 1 wherein the transport refrigeration unit includes a compressor having a compression mechanism drive shaft driven by a shaft of the diesel engine.

3. The method of claim 2 wherein the engine shaft directly drives the compression mechanism drive shaft.

4. The method of claim 2 wherein the engine shaft drives an electric generator for generating electrical power to power a compressor drive motor for driving the compressor.

5. The method of claim 1 wherein the operating engine load of the diesel engine is indicated by a fuel rack position.

* * * * *